(12) United States Patent
Tirry et al.

(10) Patent No.: US 8,588,430 B2
(45) Date of Patent: Nov. 19, 2013

(54) CONTROLLING AN ADAPTATION OF A BEHAVIOR OF AN AUDIO DEVICE TO A CURRENT ACOUSTIC ENVIRONMENTAL CONDITION

(75) Inventors: Wouter Joos Tirry, Wijgmaal (BE); Peterjan Schreurs, Leuven (BE); Ralf Funken, Waalre (NL)

(73) Assignee: NXP B.V., Eindhoven (NL)

( * ) Notice: Subject to any disclaimer, the term of this patent is extended or adjusted under 35 U.S.C. 154(b) by 252 days.

(21) Appl. No.: 13/148,752

(22) PCT Filed: Feb. 9, 2010

(86) PCT No.: PCT/IB2010/050570
§ 371 (c)(1),
(2), (4) Date: Oct. 21, 2011

(87) PCT Pub. No.: WO2010/092523
PCT Pub. Date: Aug. 19, 2010

(65) Prior Publication Data
US 2012/0027216 A1 Feb. 2, 2012

(30) Foreign Application Priority Data

Feb. 11, 2009 (EP) .................................. 09152607

(51) Int. Cl.
*H03G 3/20* (2006.01)
(52) U.S. Cl.
USPC .......... 381/57; 381/94.1; 381/94.2; 381/94.3; 381/94.7; 381/94.8; 381/98; 381/101; 381/102; 381/103; 381/104; 381/106; 381/107; 381/108; 381/83; 381/93
(58) Field of Classification Search
USPC ................. 381/57, 94.1–94.3, 94.7, 94.8, 98, 381/101–103, 104, 106–108, 320–321, 83, 381/93
See application file for complete search history.

(56) References Cited

U.S. PATENT DOCUMENTS

2003/0039352 A1   2/2003   Joncour et al.

FOREIGN PATENT DOCUMENTS

| DE | 100 39 211 A1 | 2/2002 |
| JP | 2001188599 A | * 7/2001 |
| WO | 2006/057770 A2 | 6/2006 |
| WO | 2007/140811 A1 | 12/2007 |

OTHER PUBLICATIONS

International Search Report for Int'l Application PCT/IB2010/050570 (Aug. 19, 2010).

* cited by examiner

*Primary Examiner* — Vivian Chin
*Assistant Examiner* — Paul Kim

(57) ABSTRACT

It is described a method for controlling an adaptation of a behavior of an audio device (100) to a current acoustic environmental condition. The method comprises (a) monitoring an audio output signal (x(t), x'(t)) being provided to an acoustic output device (110) of the audio device (100) for outputting an acoustic output signal, (b) measuring an audio input signal (z(t)) being provided by an acoustic input device (120) of the audio device (100), wherein the audio input signal (z(t)) is indicative for a feedback portion of the acoustic output signal and for the current acoustic environmental condition, (c) determining a relation between the audio output signal (x'(t)) and the audio input signal (z(t)) and (d) adapting the behavior of the audio device (100) based on the determined relation. Further, it is described a data processor, a computer-readable medium and an audio device, which are adapted to control and/or to carry out the above mentioned method for controlling an adaptation of the behavior of an audio device (100) to a current acoustic environmental condition.

14 Claims, 2 Drawing Sheets

CONTROLLING AN ADAPTATION OF A BEHAVIOR OF AN AUDIO DEVICE TO A CURRENT ACOUSTIC ENVIRONMENTAL CONDITION

FIELD OF THE INVENTION

The present invention relates to the technical field of controlling audio systems, which comprise both an acoustic output device such as a loudspeaker and an acoustic input device such as a microphone. In particular, the present invention relates to a method for controlling an adaptation of an audio output signal of an audio device to a current acoustic environmental condition of the audio device. Further, the present invention relates to a data processor, to a computer-readable medium and to an audio device, which are adapted to control and/or to carry out the above mentioned method for controlling an adaptation of an audio output signal to a current acoustic environmental condition.

BACKGROUND OF THE INVENTION

Depending on the situation in which a mobile device such as for instance a mobile phone is used, the desired level of an audio playback signal or of a ringtone indicating an incoming call or an incoming Short Message Service (SMS) needs to be different. For example, when in a meeting or in a rather silent office or home condition with other people in the room, one would like the playback volume to be rather low in order not to disturb other people. On the other hand, when being in a noisy environment such as a car, a pub, or in the street, one would like the ringtone to be loud enough so that the alert of an incoming call is always audible. Furthermore, when the mobile device is covered or kept in a closed environment like a pocket or bag, the ringtone is acoustically attenuated and is likely not to be heard at all even in low noisy circumstances.

In most mobile devices the playback volume of the ringtone can be adjusted manually, typically as a setting in the mobile phone's menu system. Alternatively, the ringtone volume might be controlled by so-called profiles. Thereby, the user can manually switch from one profile to another in order to change the ringtone volume. In addition, most mobiles allow the ringtone volume to increase over time, starting from a very soft the moment the call comes in, to very loud after a fixed period of time. However, manual ringtone adjustment or profile switching has the disadvantage that it requires user interaction, something people tend to forget, resulting in undesirable phone behavior. An automatic volume increase is not ideal either, because when one is located in a noisy environment only the very last part of the ringtone will be loud enough. However, because it will be audible only for a very short period, chances are high that the alert is not heard by the user and unintentionally the voice mail system will answer the incoming call.

Further, in most mobile devices a vibration feature can be enabled so that the alert of an incoming call can also be felt when keeping the mobile in a pocket in close contact with the body. However, some people do not want to have the vibration function enabled at all times or they simply tend to forget to enable it because it requires the user's attention and manual interaction. Furthermore, when the mobile is kept in a pocket or bag, there is no immediate contact with the user's body so that the vibration function will not help in notifying an alert respectively an incoming call.

More advanced mobile phones have built-in sensors like an ambient light sensor, a proximity sensor, an accelerometer, etc. Such sensors can be used to learn something about the environment of the mobile phone. However the information extracted using these sensors is typically not conclusive. For example, the ambient light sensor can be used to detect whether or not the mobile phone is covered or is located in a pocket or bag. However, it cannot distinguish this situation from the situation where the mobile phone is lying on a night table in the dark. In the first situation one would like to increase the loudness of the ringtone to compensate for the fact that it will be acoustically attenuated, whereas in the second situation one would like the ringtone playback to be gentle.

It has been proposed to measure the environmental noise level using the built-in microphone of the mobile device during a short period of time before starting an audio playback signal or a ringtone. However, this could lead to practical robustness issues as the level of an audio playback signal or ringtone is only based on the noise level estimation before the audio playback or the ringtone becomes effective. It is not possible to deal with variations in the environmental noise after the audio playback signal or the ringtone has started.

It has been further proposed to measure the noise level during audio playback signal or ringtone. However, due to a typically high acoustic coupling between the speaker and the microphone of a mobile device, a continuous echo of the audio playback signal or the ringtone will be dominant with respect to the captured ambient noise. A direct noise level measurement based on the microphone signal will lead to incorrect noise estimations, resulting in an incorrect audio playback signal or ringtone adjustment.

Furthermore, an acoustic echo canceller has been proposed, which is capable of removing the audio playback signal or the ringtone from the microphone signal. However, due to a typically very high acoustic coupling between the speaker and microphone on a mobile device, any small mismatch between the estimated echo and the echo captured by the microphone affects the quality of the remaining microphone signal. Hence, by removing the audio playback echo or the ringtone echo, the acoustic echo canceller degrades the remaining residual signal and hence also the captured ambient noise. This leads to an incorrect noise level estimation.

As elucidated above, requirements with respect to audio playback or ringtone are dependent on the situation in which the mobile device is being used and known procedures for measuring the noise of the ambient environment suffer from a high acoustic coupling between the speaker of the mobile device and the microphone of the mobile device. Therefore, there may be a need for automatically adapting the volume of an audio playback signal or a ringtone depending on the current ambient conditions in an appropriate, easy and effective manner.

OBJECT AND SUMMARY OF THE INVENTION

This need may be met by the subject matter according to the independent claims. Advantageous embodiments of the present invention are described by the dependent claims.

According to a first aspect of the invention there is provided a method for controlling an adaptation of a behavior of an audio device to a current acoustic environmental condition. The provided method comprises (a) monitoring an audio output signal being provided to an acoustic output device of the audio device for outputting an acoustic output signal, (b) measuring an audio input signal being provided by an acoustic input device of the audio device, wherein the audio input signal is indicative for a feedback portion of the acoustic output signal and for the current acoustic environmental condition, (c) determining a relation between the audio output signal and the audio input signal and (d) adapting the behavior of the audio device based on the determined relation.

This first aspect of the invention is based on the idea that an environmental background noise has a strong impact on the relation between the audio output signal and the captured audio input signal. Therefore, by measuring and/or monitoring this relation important information about the acoustic environment of the audio device can be extracted. In particular, compared to a silent surrounding a significant environmental background noise may disturb this relation. In accordance with the described method the measurement and a subsequent analysis of this disturbance may be used to steer the adaptation of the audio output signal to a clear audible level with respect to the environmental background noise. Thereby, an ambient-aware adaption of the audio output signal can be realized.

It has to be mentioned that according to the invention it is not necessary, however not forbidden, to directly measure the ambient respectively the environmental noise. Such a direct measurement could be carried out either before or during the described audio output signal adaptation method.

Generally speaking, the relation between the audio output signal and the audio input signal reflects the acoustical characteristics of the audio device and of the environment of the audio device, which may comprise both the acoustic output device and the acoustic input device. Monitoring the dynamics or changes and disturbances in this relation with respect to reference situations (e.g. no background noise, audio device lying freely on a table), may reveal information about the acoustic environment of the audio device and changes in this acoustic environment.

The described feedback portion of the acoustic output signal may be given by an acoustic coupling between the acoustic output device and the acoustic input device. Thereby, at least a portion of the acoustic output signal is fed back from the acoustic output device to the acoustic input device. Of course this portion strongly depends on the corresponding acoustic path, which may be characterized by certain attenuation and/or a certain modification of the frequency distribution of the fed back acoustic output signal.

The terms "audio output signal" and "audio input signal" refer to non-acoustical signals. In particular, the term "audio output signal" may refer to an electrical signal which is provided to the acoustic output device in order to be transformed into the acoustic output signal (i.e. a sound wave). Correspondingly, the term "audio input signal" may refer to an electrical signal which is produced by the acoustic input device in response to the receipt of the acoustic input signal and/or environmental background sound signals, which are also sound waves.

It has to be mentioned that the described relation between the audio output signal and the audio input signal can also be determined by using derivative signals of the audio output signal and/or the audio input signal. Depending on the relation between the audio output signal or the audio input signal and the respective derivative signal, the relation involving at least one derivative signal will differ in a known manner such as for instance a certain factor from the direct relation between the audio output signal and the audio input signal.

It is mentioned that the term "determining" has to be understood in a wide manner. Determining may mean for instance estimating (in particular when there is no exact value for the ratio), measuring or calculating.

The behavior of the audio device may be any functionality of the audio device, which might be introduced, removed or modified based on the determined relation between the audio output signal and the audio input signal. Thereby, the behavior adaption may be carried out when the determined relation (a) reaches a predefined value, (b) changes by a predefined difference, (c) exhibits a certain dynamic change and/or (d) shows a certain disturbance with respect to a reference value.

According to an embodiment of the invention the behavior of the audio device is given by an amplitude and/or a frequency of the audio output signal, an amplitude and/or a frequency of a vibrating mechanism of the audio device and/or a modification of the operation of a display of the audio device. The modification of the display may comprise for instance a deactivation, an activation, an enlightening of a dimming.

According to a further embodiment of the invention the relation between the audio output signal and the audio input signal is determined by applying a cross-correlation procedure, an adaptive filtering procedure and/or a coherence estimation procedure. This may provide the advantage that well-known procedures for relating different signals with each other can be employed. Of course, also other non-mentioned procedures might be used for the determination of the described relation. For instance the adaptive filtering procedure may be carried out by means of an acoustic echo canceller adaptive filter such as for instance a normalized least mean square adaptive filter.

According to a further embodiment of the invention the acoustic output device is a loudspeaker and/or the acoustic input device is a microphone. This may provide the advantage that the described audio output signal adaptation method can be carried out with many different types of audio devices. Thereby, it is not possible that the audio device itself comprises the loudspeaker and/or the microphone. The described method can also be applied if the respective audio device comprises at least interfaces for directly or indirectly connecting the loudspeaker and/or the microphone to the audio device.

The described method may exhibit the most important advantages over prior art audio output adaptation control methods if there is a strong acoustic coupling between the loudspeaker and the microphone. In this case direct noise level measurements from the captured microphone signal are mostly not possible because the ambient noise is masked by the feedback portion of the acoustic output signal.

The audio output signal may be any signal, which can be converted by the loudspeaker into sound waves. In particular, the acoustic output signal may be an audio playback signal or an alarm signal. Thereby, an ambient-aware music playback or an ambient-aware alerting of a user may be realized. In this context, if the audio device, on which the described method is carried out, is for instance a mobile phone, the alarm signal may be a ringtone indicating the user of the mobile phone an incoming call and/or an incoming SMS.

According to a further embodiment of the invention the method further comprises comparing the determined relation between the audio output signal and the audio input signal with at least one reference relation. Thereby, adapting the behavior of the audio device further takes into account a result of the comparison between the determined relation and the reference relation.

This may provide the advantage that the determined relation can be assigned to or classified into different groups of relations. Depending on the respective group different measures for adapting the behavior of the audio device can be carried out.

This further embodiment allows solving the so called "closed environments" problem, because the determined relation between the audio output signal and the audio input signal reflects the acoustical characteristics of the audio device within its acoustic environment. When the audio device is in a closed environment like a pocket or a bag or when it is covered by soft or hard material, the acoustical coupling between the acoustic output device respectively the loudspeaker and the acoustic input device respectively the microphone is different. Thereby, the acoustical coupling will be lower or higher or will be continuously changing due to movements in the pocket or bag compared to when the audio device is freely lying for instance on a table. This situation dependent deviation can be detected by comparing the acoustical coupling measure given by the comparison of the determined relation with a reference situation relation. The situation dependent deviation can be used for adjusting the audio output signal in order to increase the perceived loudness.

According to a further embodiment of the invention the method further comprises comparing the determined relation between the audio output signal and the audio input signal with a threshold. Thereby, if the determined relation is larger or smaller than the threshold, adapting the behavior of the audio device comprises increasing the signal level of the audio output signal.

It has to be mentioned that the accomplishment of the described signal level increase may be made dependent whether the amplitude of the initial audio output exceeds a further threshold, which can also be denominated a volume threshold.

In case of significant ambient noise, this determined relation will be disturbed by the captured ambient noise. Hence, by monitoring the dynamics in or disturbances on the determined relation for audio output signal levels, which are larger than the further threshold (volume threshold), a significant disturbance beyond the threshold indicates that the noise component is dominant and that the audio output signal is not loud enough. As long as disturbances beyond the threshold are measured, the audio output signal needs to be enhanced further.

A proper choice of the second (volume) threshold and/or the first (disturbance) threshold may depend on the concrete acoustical coupling characteristics of the audio device. Therefore, the threshold and/or the further threshold may need to be tuned to the acoustical characteristics of the audio device in order to provide for an optimal audio output signal adaptation. The mapping of the dynamic range of the determined relation, changes or disturbance on this relation onto the how and the amount of adaptation may need to be tuned to the acoustical characteristics of the audio device.

This embodiment of the invention may provide the advantage that indirect noise measurements are made possible even for an audio device having a strong acoustical coupling between the acoustic output device and the acoustic input device. This holds also for very silent environmental conditions.

In case of silent environmental conditions, the determined relation between the audio output signal and the audio input signal reflects the acoustical characteristics of the audio device in its silent environment. Thereby, the audio input signal, which is captured by the audio input device, represents a signal mix caused by the environmental background noise and the feedback portion of the acoustic output signal.

According to a further embodiment of the invention the audio device is a mobile communication end device. The communication end device may be capable of connecting with an arbitrary telecommunication network access point such as for instance a base station. The communication end device may be a cellular mobile phone, a Personal Digital Assistant (PDA), a notebook computer and/or any other movable communication device.

The described method may provide the advantage that an ambient-aware ringtone can indicate an incoming call. Thereby, the adaptation and in particular an increase of the loudness or a decrease of the loudness of the ringtone may depend on the acoustical characteristics of the environment of the mobile communication end device.

In this respect it is mentioned that the ringtone may comprise any arbitrary sound like a harmonic music, an identifiable noise or any sequence of tones having any arbitrary tone color.

According to a further embodiment of the invention the method further comprises detecting a picking up of the mobile communication end device based on a change in the determined relation between the audio output signal and the audio input signal. This may provide the advantage that when answering the mobile phone it can be immediately detected when the user grabs the mobile communication end device. Thereby, the detection may rely on a rapid change of the acoustic coupling between the loudspeaker and the microphone of the mobile phone when the user puts his hand around the mobile phone or when the user moves the mobile phone from its initial location.

Generally speaking, the described method provides a technique for acoustically detecting a picking up of the mobile phone for answering incoming calls based on monitoring the acoustic coupling given by the determined relation between the audio output signal and the audio input signal. Thereby, the mobile phone can be steered to adapt in particular the loudness of the ringtone towards a desired behavior.

According to a further embodiment of the invention the method further comprises generating a sensor signal by a sensor device. Thereby, adapting the audio output signal further takes into account the sensor signal.

The described sensor device may comprise any context sensor, which is capable of detecting a measurable variable of the audio device and/or of the environment of the audio device. The additional consideration of the sensor signal may provide the advantage, that the audio output signal can be adapted very precisely towards its desired behavior depending on the environmental acoustic conditions.

Generally speaking, the adaptation of the audio output signal can be further enhanced by using the acoustical detection in combination with at least one sensor signal being provided by at least one other context sensor. Thereby, additional information about the environment of the audio device might be extracted in order to make the adaptation of the audio output signal even more reliable.

According to a further embodiment of the invention the sensor device comprises a light sensitive sensor, a motion sensor, an acceleration sensor and/or a proximity sensor. At least one of such sensors, which may be built-in sensors of advanced mobile phones, can be used to learn something more specific about the environment of the audio device.

In this respect it is mentioned that the information extracted exclusively from one of such sensors is typically not conclusive. For example, an ambient light sensor can be used to detect whether or not the audio device is covered or is located in a pocket or bag. However, the ambient light sensor cannot distinguish this situation from the situation wherein the audio device is lying on a night table in the dark. In the first situation one would like to increase the loudness of the acoustic output signal to compensate for the fact that it will be muffled, whereas in the second situation one would like the acoustic output signal to be gentle. However, when additionally taking into account the determined relation between the audio output signal and the audio input signal, it may be possible to reliably distinguish between the described first situation and the second situation.

It is explicitly pointed out that two or even more sensor signals being generated by two or even more sensors can be taken into account for adapting the audio output signal. Preferably, these sensors are of different nature such that different types of information regarding the audio device environment and/or the operational state of the audio device can be used for adapting the audio output signal in a reliable manner. Thereby, the term "operational state" also includes the state of motion and/or the state of acceleration of the audio device.

According to a further aspect of the invention there is provided a data processor for controlling an adaptation of a behavior of an audio device to a current acoustic environmental condition of the audio device. Thereby, the data processor is adapted for performing the method in accordance with any one of the above-described embodiments.

Also this further aspect of the invention is based on the idea that by measuring and/or monitoring the relation between the audio output signal and the captured audio input signal valuable information about the acoustic environment of the audio device can be extracted. This information can be taken into account for optimally adapting the behavior of the audio device and in particular the signal level of the audio output device towards a desired and user comfortable level.

The described data processor may be a part of a system for acoustically detecting the changes in the acoustic environment of the audio device in order to steer the audio output signal and, as a consequence, also the acoustic output signal toward a desired behavior. Thereby, the desired behavior may be characterized by a clear perceptibility of the acoustic output signal in case of a noisy environment and by a rather gentle level of the acoustic output signal in case of a comparatively silent acoustic environment.

According to a further aspect of the invention there is provided an audio device comprising (a) an acoustic output device for outputting an acoustic output signal based in response to an audio output signal, (b) an acoustic input device for providing an audio input signal in response to a feedback portion of the acoustic output signal and/or in response to a current acoustic environmental condition, and (c) a data processor. The data processor is adapted to control any embodiment of the above described audio device behavior adaptation method.

The described audio device may be a mobile communication end device such as for instance a mobile phone. The acoustic output device may be for instance a loudspeaker. The acoustic input device may be for instance a microphone.

According to a further embodiment of the invention the audio device further comprises a sensor device, which is coupled to the data processor. Thereby, the data processor is adapted to take into account a sensor signal generated by the sensor device for adapting the audio output signal.

The described sensor device may be capable of detecting any measurable variable of the audio device and/or of the environment of the audio device. By taking into account also the sensor signal the audio output signal can be adapted even more precise towards a desired behavior depending on the environmental acoustic conditions.

The sensor device may comprise any type of sensor such as for instance a light sensitive sensor, a motion sensor, an acceleration sensor and/or a proximity sensor.

According to a further aspect of the invention there is provided a computer-readable medium on which there is stored a computer program for controlling a behavior of an audio device to a current acoustic environmental condition. The computer program, when being executed by a data processor, is adapted for controlling any embodiment of the above described audio output signal adaptation method.

According to a further aspect of the invention there is provided a program element for controlling an adaptation of a behavior of an audio device to a current acoustic environmental condition. The program element, when being executed by a data processor, is adapted for controlling any embodiment of the above described audio output signal adaptation method.

The program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The program element may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DESCRIPTION OF EMBODIMENTS

Figure 1:
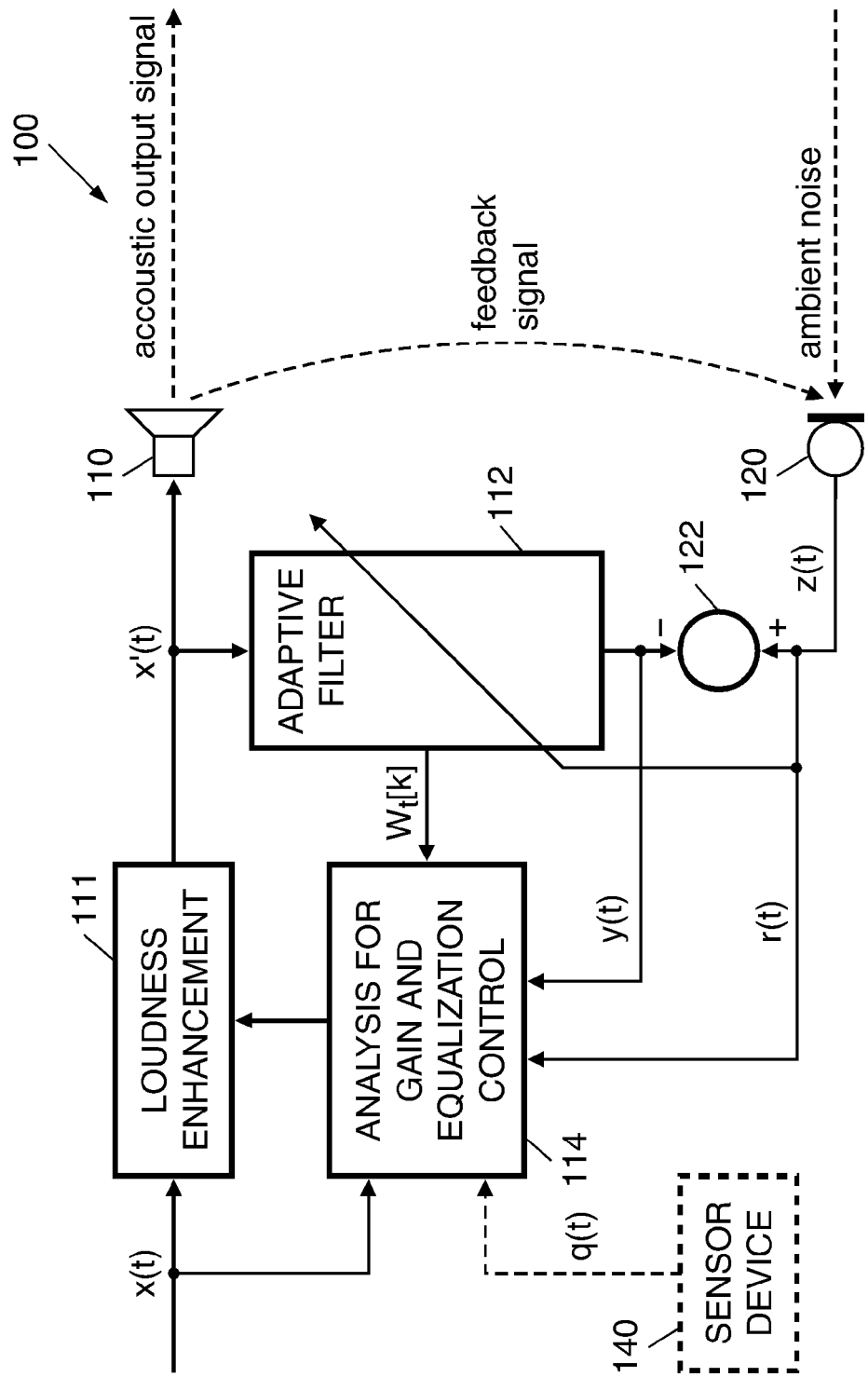
FIG. 1 shows in accordance with the invention an audio device, which comprises an adaptive filter for determining the relation between the audio output signal x'(t) and the audio input signal z(t).

The illustration in the drawing is schematically. It is noted that in different Figures, similar or identical elements are provided with reference signs, which are different from the corresponding reference signs only within the first digit.

FIG. 1 shows an audio device 100 in accordance with the invention. According to the embodiment described here the audio device is a mobile phone 100. The mobile phone comprises an acoustic output device 110 and an acoustic input device 120. The acoustic output device is a loudspeaker 110, the acoustic input device is a microphone 120. The loudspeaker 110 is driven by an audio output signal x'(t). The audio output signal x'(t) is generated by a loudness enhancement unit 111. The audio output signal x'(t) is generated based on an original audio signal x(t), which is fed to the loudness enhancement unit 111. According to the embodiment described here the original audio signal x(t) and the audio output signal x'(t) represent a ringtone for the mobile phone 100. The ringtone may in particular indicate an incoming call.

Due to a relatively close distance between the loudspeaker 110 and the microphone 120 there will be a strong acoustic coupling between the loudspeaker 110 and the microphone 120. As a consequence, a feedback signal, which is a portion of the acoustic output signal generated by the loudspeaker, will propagate from the loudspeaker 110 to the microphone 120. The strength of this coupling depends on the acoustic property of the mobile phone 100 and of the environment of the mobile phone 100. If the mobile phone 100 is located for instance in a pocket or a bag, the acoustic coupling may be attenuated. Further, the frequency distribution of the received feedback signal and the acoustic output signal may be different because of a frequency dependent attenuation.

As can be seen from FIG. 1, the mobile phone further comprises an adaptive filter 112. The adaptive filter 112 receives the audio output signal x'(t). The adaptive filter 112 is connected with an adding unit 122, which receives an estimated feedback signal y(t) from the adaptive filter 112. Further, the adaptive filter 112 is connected with an analysis and control unit 114, which also receives the estimated feedback signal y(t). This means that the adaptive filter 112 emulates the acoustic path between the audio output signal x'(t) and an audio input signal z(t) generated by the microphone. This acoustic path also includes the acoustic properties of the loudspeaker 110 and of the microphone 120.

The audio input signal z(t) is indicative for the acoustical input signal captured by the microphone 120. This acoustical input signal is the sum of the feedback signal and an ambient noise signal.

As can be further seen from FIG. 1, the estimated feedback signal y(t) is fed to a negative input of the adding unit 122. A positive input of the adding unit 122 is fed with the audio input signal z(t). The adding unit 122 calculates the difference between the audio input signal z(t) and the estimated feedback signal y(t). Therefore, the adding unit 122 acts as a subtraction unit. The difference between the audio input signal z(t) and the estimated feedback signal y(t) is a residual signal r(t), which contains the sum of the ambient noise and the remaining feedback signal not modeled by the adaptive filter.

According to the embodiment described here the mobile phone 100 further comprises a sensor device 140. The sensor device 140 generates a sensor signal q(t), which is fed to the analysis and control unit 114.

Descriptive speaking, FIG. 1 depicts an example of a possible implementation of the invention applied for ambient ringtone playback signal (i.e. the audio output signal x'(t)) of a mobile phone 100. In this embodiment the relation between the playback signal x'(t) and the captured microphone signal z(t) is estimated using the adaptive filter 112. The resulting estimated feedback signal y(t), the residual signal r(t) and the filter coefficients of the adaptive filter 112 are used for measuring changes and disturbances introduced by the acoustic properties of the environment of the mobile phone 100. Details of this embodiment are described in the following with reference to FIG. 2.

Figure 2:
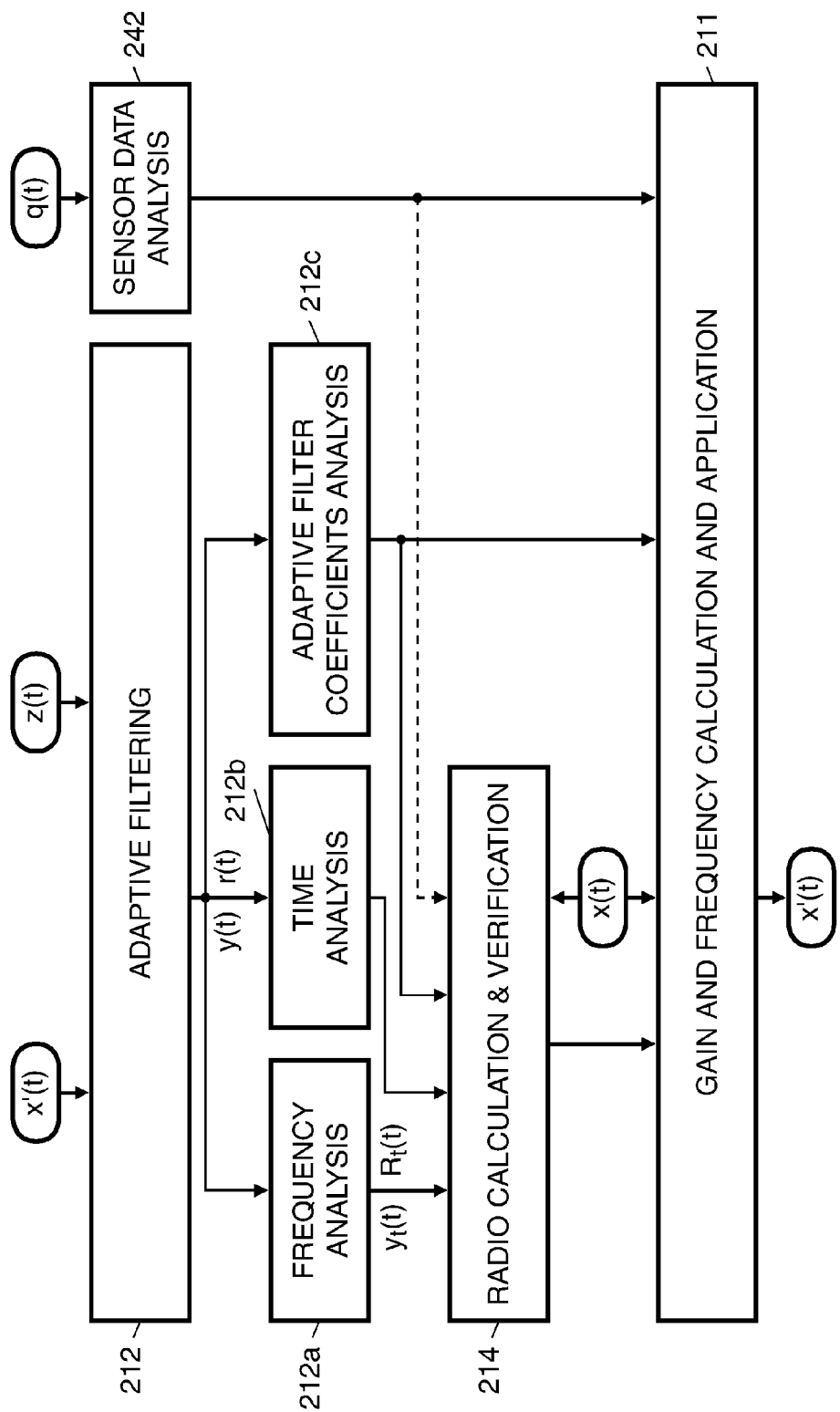
FIG. 2 shows a block diagram indicating the operation of the audio device depicted in FIG. 1.

FIG. 2 shows a block diagram of the operation of the audio device 100. In the described embodiment the relation between the audio output signal x'(t) representing the playback signal and the audio input signal z(t) representing the captured microphone signal is estimated by means of an adaptive filter. The resulting estimated feedback signal, the residual signal r(t) and the filter coefficients of the adaptive filter are used for measuring changes and disturbances introduced by the acoustic properties of the environment. In the following the operation of each block will be described consecutively.

Block 212: Adaptive Filtering

According to the embodiment described here the adaptive filtering procedure is carried out by means of an acoustic echo canceller adaptive filter such as for instance a normalized least mean square adaptive filter. The adaptive filter has as inputs (a) the audio output signal respectively the ringtone signal x'(t) which is played through the loudspeaker of the mobile phone, and (b) the audio input signal respectively the captured microphone signal z(t). The adaptive filter models the electro-mechanical acoustic echo path between the microphone signal z(t) and the reference signal x'(t). The outputs of the adaptive filter are the feedback respectively the echo estimate y(t) and the residual signal r(t). These outputs are used by the block 212a and the block 212b for a time and frequency analysis to measure the feedback reduction performance (the ratio between the determined feedback signal and the residual signal) of the adaptive filter to analyze the disturbance introduced by the ambient noise. The corresponding coefficients $w_t[k]$ of the adaptive filter, which represent the estimated feedback path, are used by block 212c for monitoring the dynamic behavior of the acoustical feedback path of the mobile phone in its environment. Thereby, k is the number of the respective filter coefficient.

Block 212a: Frequency-Domain Analysis

The block 212a performs a time-to-frequency transformation, e.g. a Discrete Fourier Transform, on the signal y(t) and r(t) in order to analysis the frequency content of the signals. Thereby, the respective signals $Y_t(f)$ and $R_t(f)$ are generated. The output signals of the time-to-frequency transformation are used in block 214 to analyze the feedback reduction performance of the adaptive filter.

Block 212b: Time-Domain Analysis

The block 212b performs a broadband power calculation on the signal x'(t) as described by the following equation (1):

$$P_x(t) = \sum_{t1}^{t2} x'(t)^2 \qquad (1)$$

This power $P_X(t)$ is compared to a threshold $P_{X\_Threshold}$ in order to select the desired parts of the ringtone as described in equation (2) for measuring the performance of the adaptive filter.

$$\text{Desired\_X\_Signal}(t) = (P_x(t) > P_{x\_Threshold}) \qquad (2)$$

Applying equation (2) can be understood as a ringtone power detection. Preferably, the threshold $P_{X\_Threshold}$ is to be tuned to the acoustics of the mobile phone.

Block 212c: Adaptive Filter Coefficient Analysis

This block 212c performs the analysis on the adaptive filter coefficient $w_t[k]$ to monitor the dynamic behavior of the acoustical feedback path of the mobile phone in its environment. Two different measures can be calculated:

A) The normalized Euclidian distance $\Delta_w(t)$ of the filter coefficient over time, calculated according to equation (3).

$$\Delta_w(t) = \sqrt{\left( \frac{\sum_{0}^{N} (w_t[k] - w_{t-1}[k])^2}{\sum_{0}^{N} (w_t[k])^2} \right)} \quad (3)$$

B) The sum of the filter coefficients Sum Coeff(t), calculated according to equation (4). Thereby the state of the adaptive filter is calculated.

$$SumCoeff(t) = \sum_{0}^{N} (w_t[k])^2 \quad (4)$$

The value of the normalized Euclidian distance $\Delta_w(t)$ is low if the mobile phone is in a steady state. If the value of $\Delta_w(t)$ is higher than a certain threshold $\Delta_{Threshold}$, this means that the adaptive filter is adapting to a new environment. This change of environment is called a path change, for example caused by a hand being near the mobile phone, or the mobile phone being moved from an initial location to a new location, etc.

By means of the following equation (5) a divergence of the adaptive filter can be detected.

$$AdaptiveFilterDiverged(t) = (\Delta_w(t) > \Delta_{Threshold}) \quad (5)$$

Initially the adaptive filter needs to adapt to the environment. The convergence of the adaptive filter can be detected by applying the following equation (6):

$$AdaptiveFilterConverged(t) = (\Delta_w(t) < \Delta_{Threshold}) \quad (6)$$

The value of Sum Coeff(t) is compared to a reference value Sum $Coeff_{Reference}$.

This reference value represents the acoustical coupling when the mobile phone is lying in an open environment on a desk. The reference value Sum $Coeff_{Reference}$ threshold depends on the acoustics of the device.

If the value Sum Coeff(t) differs by more than a certain percentage $\Delta_{Sum\ Coeff}$ compared to the reference value Sum $Coeff_{Reference}$, it can be assumed that the mobile phone is located in a closed environment causing the acoustical coupling to be higher or lower. According to the embodiment described here this check is done for two different time intervals, an initial time period $[T_{SumCoeff1}: T_{Sum\ Coeff2}]$ after convergence of the adaptive filter and the consecutive time period $[T_{SumCoeff2}: \infty]$ as shown in the following equation (7) and the following equation (8). The value $T_{SumCoeff1}$ is equal to the moment in that the adaptive filter has initially converged (value of AdaptiveFilterConverged(t) changing from 0 to 1). In other words, equation (7) represents a detector for the initial acoustical coupling state of the adaptive filter and equation (8) represents a detector for the modified acoustical coupling state of the adaptive filter.

$$\forall t \in [T_{SumCoeff1}:T_{SumCoeff2}], \quad (7)$$

$AdaptiveFilterInitialState(t) =$ $$\begin{cases} 0 & (SumCoeff(t) < (1 - \Delta_{SumCoeff}) \times SumCoeff_{Reference}) \\ 2 & (SumCoeff(t) > (1 + \Delta_{SumCoeff}) \times SumCoeff_{Reference}) \\ 1 & otherwise \end{cases}$$

$$\forall t \in [T_{SumCoeff2}:\infty[, \quad (8)$$

$AdaptiveFilterModifiedState(t) =$ $$\begin{cases} 0 & (SumCoeff(t) < (1 - \Delta_{SumCoeff}) \times SumCoeff_{Reference}) \\ 2 & (SumCoeff(t) > (1 + \Delta_{SumCoeff}) \times SumCoeff_{Reference}) \\ 1 & otherwise \end{cases}$$

Block 214: Ratio Calculation and Verification

The raw performance RatioEcho(t)) of the adaptive filter is measured by comparing the power of $Y_t(f)$ and $R_t(f)$ for certain frequency bins. Equation (9) is used to calculate the performance of the adaptive filter.

$$RatioEcho(t) = \left( \frac{\sum_{f1}^{f2} Y_t(f)^2}{\sum_{f1}^{f2} R_t(f)^2} \right) \quad (9)$$

A "filtered" performance RatioEchoFilt(t) of the adaptive filter is calculated depending on the positive detection in block 212b according to equation (2).

This "filtered" performance RatioEchoFilt(t) of the adaptive filter is compared to a performance threshold Ratio $Echo_{Threshold}$ as described in equation (10). This threshold depends on the acoustics of the mobile phone and on the desired amount volume increase to be applied to x(t). In other words, equation (10) is used to detect a poor performance of the adaptive filter.

$$PoorPerformance(t) = (RatioEchoFilt < RatioEcho_{Threshold}) \quad (10)$$

The results of this detector are used to calculate an adequate volume change in block 211. The performance can be calculated for several frequency bands in order to obtain more information about the performance of the adaptive filter in the different frequency bands. This information can then be used to equalize the signal x(t) to enhance the audibility in the noisy environment.

Block 211: Gain and Frequency Calculation and Application

This block 211 calculates the gain, compression and/or the equalization, basically any filtering that needs to be applied to the original audio signal x(t) to enhance the loudness of ringtone with respect to its environment. This calculation depends on the detection results of block 214 and block 212c. The following describes a possible gain function implementation:

For every period of time $T_{GainAnalysis}$ after convergence of the adaptive filter (equation 6), if a poor performance of the adaptive filter has been detected by the block 212c (equation 10), the gain will be increased with a certain value $G_{Increase}$.

The value $G_{Increase}$ is depending on the value of AdaptiveFilterInitialState(t). If the value AdaptiveFilterInitialState(t) is equal to 0, indicating that the ringtone playback is muffled, a higher increase value $G_{IncreaseHigh}$ is used.

If the value of AdaptiveFilterInitialState(t) or AdaptiveFilterModifiedState(t) is equal to 2 after $T_{SumCoeff2}$, the mobile phone is assumed to be located in a closed environment. In this case the gain is increased to a certain high gain value to compensate the fact that the ringtone is muffled as well.

If a path change or a change in state of the adaptive filter has been detected, the gain increase is stopped for a certain period of time. Furthermore, if the value of AdaptiveFilterModified- State(t) is different from 1 after $T_{SumCoeff2}$, this indicates that the mobile phone has been picked-up by a user. In this case, the gain is lowered to its initial value.

Block 212: Sensor Data Analysis

This block 212, which is optional, performs an analysis of other sensor data provided by a sensor signal q(t) in order to give additional information about the environment of the device, which can enhance the detection. As has already been mentioned above, the sensor signal q(t) may be provided by any context sensor, which is capable of detecting a measurable variable of the mobile phone and/or of the environment of the mobile phone. The additional consideration of the sensor signal q(t) may provide the advantage, that the audio output signal can be adapted very precisely towards its desired behavior depending on the environmental acoustic conditions.

The sensor providing the sensor signal q(t) may be a light sensitive sensor, a motion sensor, an acceleration sensor and/or a proximity sensor. Preferably, the sensor is a built-in sensor of the mobile phone.

Apart from the mobile phone application of the invention described above the audio output signal adaptation procedure described in this application may also be used for other applications. The described acoustical monitor and detection mechanism based on analyzing the dynamics in a determined relation between the audio playback signal and the captured microphone signal can generally be used to steer any playback audio device and its playback towards a desired behavior. Specifically, the described audio output signal adaptation can be used for instance for an automatic ambient noise adaptive speech enhancement. Further, an automatic ambient noise adaptive playback on any audio devices may be implemented, on which direct noise level measurements from the captured microphone signal are not possible because the ambient noise is masked by the echo from the audio playback. Furthermore, the described mechanism can be used for an acoustical detector using the loudspeaker and the microphone signal to steer the audio device and the audio playback towards its desired behavior in response to a change in or detection of a certain acoustical environment of the audio device, e.g. a proximity detector.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

In order to recapitulate the above described embodiment of the present invention one can state:

In this application there is described an acoustical monitor and detection system to steer the adaptation or enhancement of acoustic output signals of an audio device depending on the acoustic characteristics of the environment of the audio device including adaptation of other functionality of the audio device. The audio device comprises an acoustic output device such as for instance a loudspeaker and an acoustic input device such as for instance a microphone. The acoustic properties of the environment influence a relation or a mapping between the audio output signal producing the acoustic output signal and the audio input signal being captured by the acoustic input device. A change or a disturbance in the environment of the audio device causes a change or a disturbance in a determined or estimated relation between the audio output signal and the captured audio input signal. By measuring and monitoring this relation or derivative of these signals and its dynamics, the audio device can identify changes or disturbances in the environment of the with respect to reference situations. Thereby, an acoustical detection mechanism is defined, which is used to steer the audio device and in particular the audio output signal towards a desired behavior depending on the acoustic environmental conditions.

More specific, this invention allows adaptation of ringtone or audio playback on mobile audio devices depending on the level of the environmental background noise, which is not possible by direct noise measurement techniques due to a high acoustical coupling between the acoustic output device and the acoustic input device. In addition, by evaluating the above described relation between the audio output signal and the captured audio input signal a detection mechanism can be established, which can find out whether the mobile audio device is covered or is located in a closed environment like a pocket or a bag during a ringtone playback representing the above mentioned acoustic output signal. This situation requires as well an adjustment of the ringtone volume and equalization accordingly, so that the ringtone can be heard. In addition, by evaluating the above described relation between the audio output signal and the captured audio input signal an acoustic detection mechanism may be provided for detecting a pick-up of the mobile audio device so that the ringtone playback level can be reduced back to a soft, comfortable level or mute when answering the call has already started.

REFERENCE NUMERALS 100 audio device/mobile phone
110 acoustic output device/loudspeaker
111 loudness enhancement unit
112 adaptive filter
114 analysis and control unit
120 acoustic input device/microphone
122 adding unit
140 sensor device
r(t) residual signal
q(t) sensor signal
x(t) original audio signal
x'(t) audio output signal
y(t) estimated feedback signal
z(t) audio input signal
$w_t[k]$ adaptive filter coefficients
211 Gain and Frequency Calculation and application
212 Adaptive Filtering
212a Frequency Analysis
212b Time Analysis
212c Adaptive Filter Coefficients Analysis
214 Ratio Calculation and Verification
242 Sensor Data Analysis
r(t) residual signal
$R_t(f)$ fourier transform of r(t)
q(t) sensor signal
x(t) original audio signal
x'(t) audio output signal
y(t) estimated feedback signal
$Y_t(f)$ fourier transform of y(t)
z(t) audio input signal

The invention claimed is:

1. A method for controlling an adaptation of a behavior of an audio device to a current acoustic environmental condition, the method comprising:
monitoring an audio output signal being provided to an acoustic output device of the audio device for outputting an acoustic output signal,
measuring an audio input signal being provided by an acoustic input device of the audio device, wherein the audio input signal is indicative for a feedback portion of the acoustic output signal and for the current acoustic environmental condition, receiving the audio signal by an adaptive filter, providing an estimated feedback signal from the adaptive filter, determining a residual signal as a difference between the audio input signal and the estimated feedback signal, performing a time-to-frequency transformation on the estimated feedback signal and on the residual signal to generate the respective time-to-frequency transformation output signals and, using the time-to-frequency transformation output signals to analyze the feedback reduction performance of the adaptive filter by comparing the power of the time-to-frequency transformation output signals for certain frequency bins, determining a relation between the audio output signal and the audio input signal from the analyzed feedback reduction performance of the adaptive filter, and adapting the behavior of the audio device based on the determined relation.

2. The method as set forth in claim 1, wherein the behavior of the audio device is given by
   an amplitude and/or a frequency of the audio output signal,
   an amplitude and/or a frequency of a vibrating mechanism of the audio device and/or
   a modification of the operation of a display of the audio device.

3. The method as set forth in claim 1, wherein the relation between the audio output signal and the audio input signal is determined by applying a cross-correlation procedure, an adaptive filtering procedure and/or a coherence estimation procedure.

4. The method as set forth in claim 1, wherein the acoustic output device is a loudspeaker and/or the acoustic input device is a microphone.

5. The method as set forth in claim 1, further comprising:
   comparing the determined relation between the audio output signal and the audio input signal with at least one reference relation,
   wherein
   adapting the behavior of the audio device further takes into account a result of the comparison between the determined relation and the reference relation.

6. The method as set forth in claim 1, further comprising:
   comparing the determined relation between the audio output signal and the audio input signal with a threshold,
   wherein
   if the determined relation is larger or smaller than the threshold, adapting the behavior of the audio device comprises increasing the signal level of the audio output signal.

7. The method as set forth in claim 1, wherein the audio device is a mobile communication end device.

8. The method as set forth in claim 7, further comprising:
   detecting a picking up of the mobile communication end device based on a change in the determined relation between the audio output signal and the audio input signal.

9. The method as set forth in claim 1, further comprising:
   generating a sensor signal by a sensor device,
   wherein
   adapting the audio output signal further takes into account the sensor signal.

10. The method as set forth in claim 9, wherein the sensor device comprises:
    a light sensitive sensor,
    a motion sensor,
    an acceleration sensor, and/or
    a proximity sensor.

11. A data processor for controlling an adaptation of a behavior of an audio device to a current acoustic environmental condition of the audio device, wherein the data processor is adapted for performing the method as set forth in claim 1.

12. An audio device comprising:
    an acoustic output device for outputting an acoustic output signal based in response to an audio output signal,
    an acoustic input device for providing an audio input signal in response to a feedback portion of the acoustic output signal and/or in response to a current acoustic environmental condition, and
    a data processor as set forth in claim 11.

13. The audio device as set forth in claim 12, further comprising:
    a sensor device, which is coupled to the data processor, wherein the data processor is adapted to take into account a sensor signal generated by the sensor device for adapting the audio output signal.

14. A non-transitory computer-readable medium on which there is stored a computer program for controlling an adaptation of a behavior of an audio device to a current acoustic environmental condition, the computer program, when being executed by a data processor, is adapted for
    monitoring an audio output signal being provided to an acoustic output device of the audio device for outputting an acoustic output signal,
    measuring an audio input signal being provided by an acoustic input device of the audio device, wherein the audio input signal is indicative for a feedback portion of the acoustic output signal and for the current acoustic environmental condition,
    receiving the audio signal by an adaptive filter,
    providing an estimated feedback signal from the adaptive filter,
    determining a residual signal as a difference between the audio input signal and the estimated feedback signal,
    performing a time-to-frequency transformation on the estimated feedback signal and on the residual signal to generate the respective time-to-frequency transformation output signals and,
    using the time-to-frequency transformation output signals to analyze the feedback reduction performance of the adaptive filter by comparing the power of the time-to-frequency transformation output signals for certain frequency bins,
    determining a relation between the audio output signal and the audio input signal from the analyzed feedback reduction performance of the adaptive filter, and
    adapting the behavior of the audio device based on the determined relation.

* * * * *